Figure 1:
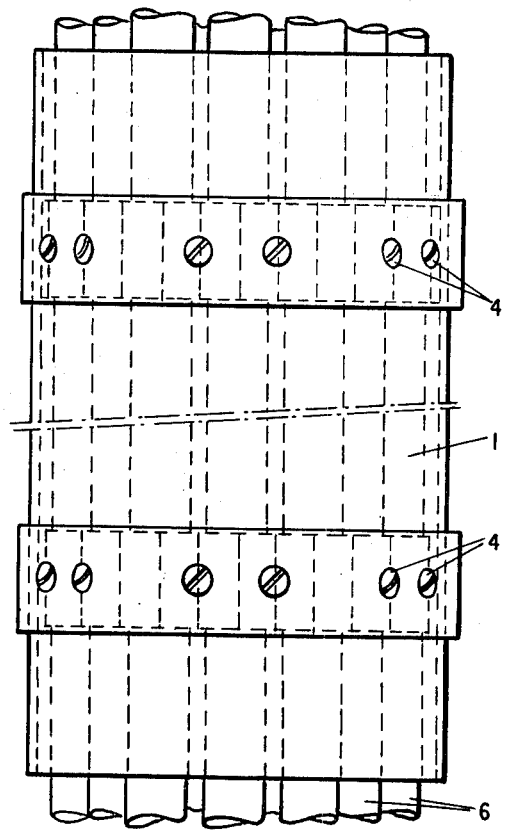

Jan. 11, 1966 J. A. BEKKERING ET AL 3,228,854

REACTOR CORES

Filed Nov. 23, 1962

2 Sheets-Sheet 1

INVENTORS
Johan A. Bekkering
Willem F. Heshuysen
Hans B. van Niederveen
BY Cushman, Darby & Cushman
ATTORNEYS Jan. 11, 1966  J. A. BEKKERING ET AL  3,228,854
REACTOR CORES
Filed Nov. 23, 1962  2 Sheets-Sheet 2
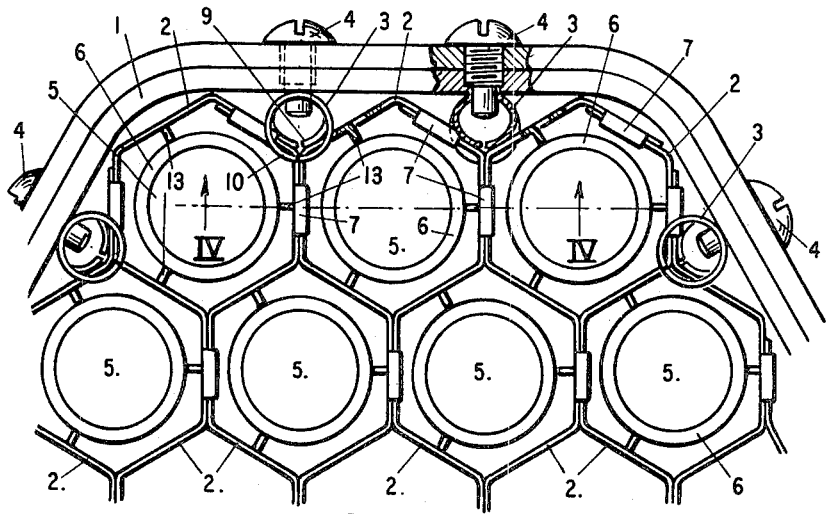
FIG. 3
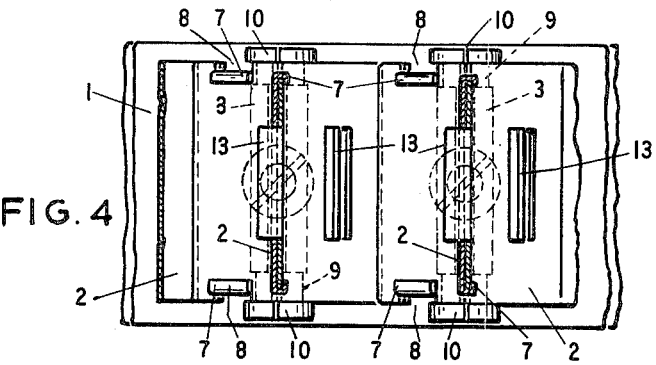
FIG. 4
FIG. 8
FIG. 5
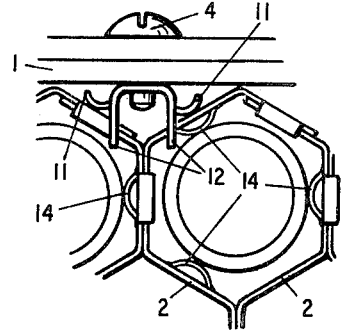
FIG. 6
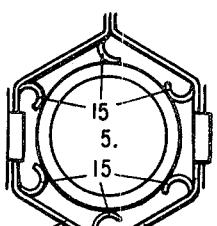
FIG. 7
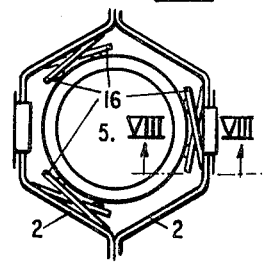
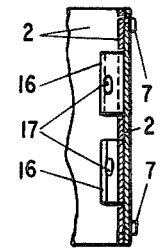
INVENTORS
Johan A. Bekkering
Willem F. Heshuysen
Hans B. van Nederveen
BY Cushman, Darby & Cushman
ATTORNEYS

3,228,854
REACTOR CORES

Johan A. Bekkering and Willem F. Heshuysen, The Hague, and Hans B. van Nederveen, Papendrecht, Netherlands, assignors to Reactor Centrum Nederland, The Hague, Netherlands, an institute of the Netherlands
Filed Nov. 23, 1962, Ser. No. 239,580
Claims priority, application Netherlands, Nov. 30, 1961, 271,986
4 Claims. (Cl. 176—78)

The invention relates to a reactor core, of which the fissionable material is used in the shape of thin vertical rods extending side by side at predetermined distances from one another and being passed through supporting lattices made from strip material, said rods being kept in place by said lattices.

In reactor cores, of which the fissionable material consists in long, thin rods, e.g. rods having a length of 130 cm. and a diameter of 1.2 cm., or is contained in thin-walled tubes of corresponding dimensions and made of material able to resist high temperatures the rods or tubes, which thereinafter are also called rods of fissionable material, must be supported locally. The supporting lattices used therefor have to meet various conditions. They may not form an obstacle to the current of moderator-coolant flowing through the spaces between the rods of fissionable material. They must be mechanically rigid in order to prevent that during operation, the rods vary their position. Furthermore the contact area between the supporting lattices and the rods of fissionable material must be reduced to the utmost and said lattices may not have a perceptible influence on the neutron-economy of the reactor core. Finally a structure is recommended, in which the supporting lattices exert a certain clamping force on the rods of fissionable material, so that said rods are held in the required position with certainty.

The invention has for its object to provide a supporting lattice which meets the made conditions in a favourable manner and also has a simple construction. It consists in that the supporting lattices are shaped as networks, the strip material of said lattices surrounding at some distance the rods of fissionable material passed through the meshes thereof and spacer members being provided between said strip material and the rods and keeping the rods centred in the meshes. The net-shape gives the supporting lattices a great rigidity, so that very thin strip material, e.g. strips having a thickness of 0.2 mm. can be used therefor. Such thin strip material does not offer serious resistance to the current of moderator-coolant. Furthermore said strip material has only a slight influence on the neutron-economy. The spacer members can easily be so constructed as to contact the rods of fissionable material in only very small areas.

Advantageously each supporting lattice is formed of meander- or zigzag-shaped strips extending side by side in offset relation of half the pitch of the meander or zigzag, said strips being interconnected with their adjoining parts.

The spacer members may be partially stamped out of the strip material of the lattices and may for instance have the shape of lips which are connected with only one edge to the lattices and are bent towards the rods. In order to obtain a certain clamping force between the lips and the rods of fissionable material the lips may be bent in the shape or substantially in the shape of a circle and may extend through at least a semi-circle. Due to this bent shape the lips are somewhat resilient. It is also advantageous to use, for centering the rods of fissionable material, lips which are partially stamped out of the strip material and which lie in pairs at different heights, pointing towards one another and being so bent towards the rods as to cross each other in pairs.

Furthermore the lattices may be mounted in sleeves of sheet material and kept in place by supporting members connected to said sleeves. These supporting members may each consist of a plate, of which the width is greater than that of the strip material of the supporting lattices, the plane of said plate being divided by incisions parallel to the plane of the relevant lattice into an intermediate portion and two marginal portions. The intermediate portion is bent so as to extend in radial direction up to the periphery of the relevant supporting lattice and saves said lattice from radial movement. The end portions are bent so as to extend over as well as under the peripheral strips of the lattice to lock said lattice against axial movement.

Figure 2:
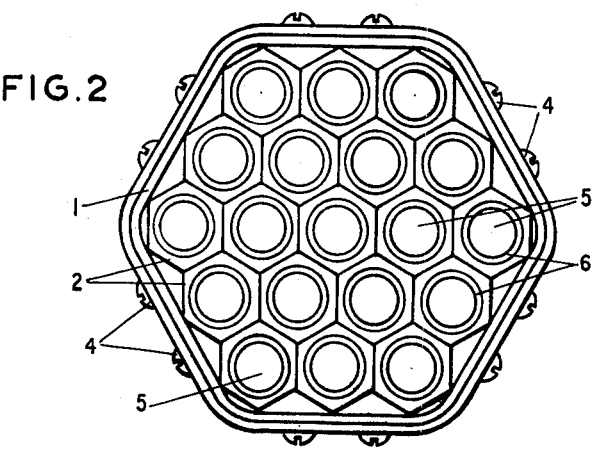

The invention will be further elucidated with the aid of the accompanying drawing which illustrates by way of example a number of embodiments of the invention. In the drawing is:

FIG. 1 a front view of a sleeve comprising rods of fissionable material shown on true scale and supported by lattices according to the invention, FIG. 2 a plan view of said sleeve, FIG. 3 on an enlarged scale a plan view of a part of such a supporting lattice containing rods of fissionable material, FIG. 4 a sectional view along the line IV—IV of FIG. 3, FIG. 5 a variant of the supporting lattice shown in FIG. 3, FIG. 6 a second variant of the supporting lattice, FIG. 7 a third variant of said lattice, and FIG. 8 a sectional view along the line VIII—VIII of FIG. 7.

In the drawing 1 is a sleeve of sheet material, in which comb-shaped lattices 2 composed of strip material are mounted near the ends thereof, said lattice being kept in place by supporting members 3 which are supported by fastening members such as screws 4 provided in the wall of the sleeve 1. In the illustrated embodiments the strips from which the lattices 2 are of angular corrugated form approximated by a sequence of straight portions, and they are mounted in pairs in offset relation of half the pitch of the angular corrugations and connected to one another. More specifically, they form a net-shaped lattice having hexagonal meshes, through which the rods of fissionable material consisting of thin-walled tubes 6 filled with fissionable material 5 are passed. Instead of hexagonal meshes the lattices may also comprise square, rectangular, diamond-shaped or other polygonal meshes. Also triangular meshes are possible, in which case regularly a zigzag-strip is connected to a straight strip.

The interconnecting means of the strip consist of lips 7 formed by incisions made in the upper and the lower edge of the one strips, said lips being bent over the bottom of recesses 8 made in the upper and the lower edge of the other strips (see FIGS. 4 and 8). This interconnection may also be carried out in another manner, say by means of massive or hollow rivets, staples, soldering, spot-welding or like connecting means.

In the embodiments shown in FIGS. 3, 4 and 5 the supporting members 3 consist of bent plates, which are divided into an intermediate portion and end-portions by incisions. In FIGS. 3, 4 the intermediate portion 9 is bent in the shape of a circle and it has such a radius as to save the relevant lattice from radial movement with respect to the sleeve 1. The end-portions 10 are also bent in the shape of a circle, but their radius is greater and they extend over the lower edge and the upper edge of the periphery of the lattice, so that they lock the lattice against axial movement. The supporting members shown in FIG. 5 differ from those shown in FIGS. 3, 4 in that the intermediate portion for the radial lock have semi-circular lips 11 which are bent outwards and in that the end-portions 12 have a U-shape turned inwards. The supporting members stamped out of thin sheet material are light and strong and they can be easily manufactured and connected to the sleeve 1.

The rods of fissionable material 5, 6 are so passed through the meshes of the lattices as to be free from the strip material of the lattices. Said rods are kept centred by spacer members having the shape of lips partially stamped out of the strip material of the lattices and bent inwards. In FIGS. 3, 4 these lips 13 are bent at right angles so that they are radially directed. In the embodiment shown in FIG. 5 strips 14 are partially stamped out of the strip material, said strips being connected at both ends with the strips 2. In FIG. 6 the lip-shaped spacer members 15 are bent in the shape of a circle and in FIGS. 7, 8 lips 16 pointing towards each other and lying in pairs at different heights are partially stamped out of the strip material, said lips being bent inwards into an oblique position and crossing one another. The lips 16 are provided with protuberances 17 which reduce the contact area between the rods and the lattice to a point. The spacer members shown in FIGS. 6, 7 and 8 have in relation to those shown in FIGS. 3, 4 and 5 the advantage that they are resilient in radial direction so that they are able to exert a certain clamping force on the rods 5, 6 whereby the latter are held in the meshes of the lattices without any clearance.

The net-shaped lattices and accessories can be eassily manufactured and they are strong and so that they can be made from relatively very thin strip material, say strip material having a thickness of 0.2 mm. In the present case the height of the lattices may be made 20 mm. Such lattices hardly offer any resistance to the moderator-coolant propelled through the spaces left between the rods 5, 6. Moreover they have little influence on the neutron-economy. The contact area between the lips 13, 14, 15, 16 and the rods 5, 6 is essentially line contact and may even be reduced to a point by the protuberances 17, so that the quantity of heat transferred by the rods directly to the lattices is small and the lattices may be made, without any danger, from less temperature resisting, that means cheaper, material than the tubes 6 containing the fissionable material 5. The lattices may be manufactured from stainless steel, whereas the tubes 6 may consist of a zirconium alloy.

The sleeves 1 comprising the lattices 2 may have a larger cross sectional area than is illustrated in FIGS. 1 and 2, thus may contain more rods 5, 6 of fissionable material. The reactor core is composed of a number of such sleeves, which are positioned in certain places in the core and spaced apart to offer room to control rods and measuring instruments. The cross sectional areas of the sleeves need not be similar to those of the meshes of the lattices.

What we claim is:

1. Reactor core comprising a set of vertical rods containing the fissionable material and extending side by side at predetermined distances from one another, horizontal supporting lattices shaped as networks and made from strips of angular corrugated form approximated by a sequence of straight portions, said strips extending side by side in offset relation of half the pitch of the angular corrugations and being interconnected at their adjoining portions to form the meshes of said lattices, said rods being passed through the meshes of said lattices and surrounded by the strip material thereof at some radial distance and spacer members in the form of resilient lips provided on the strip material of the lattices, said lips being connected to the strip material with one edge only and extending into the meshes into resilient line contact with the rods so as to hold the rods resiliently centered in said meshes, said lips being partially stamped out of the strip material of the supporting lattices and lying in pairs at different levels, said lips pointing toward each other in parts and being so bent out of the surface of the strip material surrounding the meshes toward the rods as to cross each other in pairs.

2. Reactor core as claimed in claim 1 comprising in addition sleeves of sheet material, the supporting lattices being mounted in said sleeves and supporting members connected to said sleeves and adapted to keep the supporting members in place in said sleeves, each supporting member being made from a plate, of which the width is greater than that of the strip material of the lattices, the plane of said plate being divided by incisions parallel to the plane of the relevant lattice into an intermediate portion and two marginal portions, said intermediate portion being so bent as to extend in radial direction up to the periphery of the relevant supporting lattice to lock the latter against radial movement and the marginal portions of said plate being so bent as to pass over as well as under the peripheral strips of said lattice to lock the latter against axial movement.

3. Reactor core as claimed in claim 2 wherein the marginal portions and the intermediate portion of each of said plates are bent into generally circular form, the axes of which are parallel to the axes of said rods, the diameter of the marginal portions being greater than the diameter of the intermediate portion; and a fastening member associated with each plate and passing through an adjacent portion of said sleeve.

4. Reactor core as claimed in claim 2 wherein the marginal portions of said plates are bent in the general form of a U the legs of which extend inwardly of the sleeve and the intermediate portion of said plates are bent out of the legs of the U in the shape of two semicircular lips which face outwardly of the sleeve; and a supporting member associated with each plate and passing through an adjacent portion of said sleeve.

References Cited by the Examiner

UNITED STATES PATENTS 3,068,163 12/1962 Currier et al. _____ 176—78
3,142,627 7/1964 Emerson _____ 176—78

FOREIGN PATENTS 1,259,772 3/1961 France.

OTHER REFERENCES

German application No. 1,082,679, printed June 2, 1960.
German application No. 1,085,976, printed July 28, 1960.
German application No. 1,086,356, printed August 4, 1960.
German application No. 1,087,285, printed August 18, 1960.
German application No. 1,093,500, printed November 24, 1960.
German application No. 1,104,082, printed April 6, 1961.

BENJAMIN R. PADGETT, *Primary Examiner.*

REUBEN EPSTEIN, *Examiner.*

L. D. RUTLEDGE, *Assistant Examiner.*